UNITED STATES PATENT OFFICE.

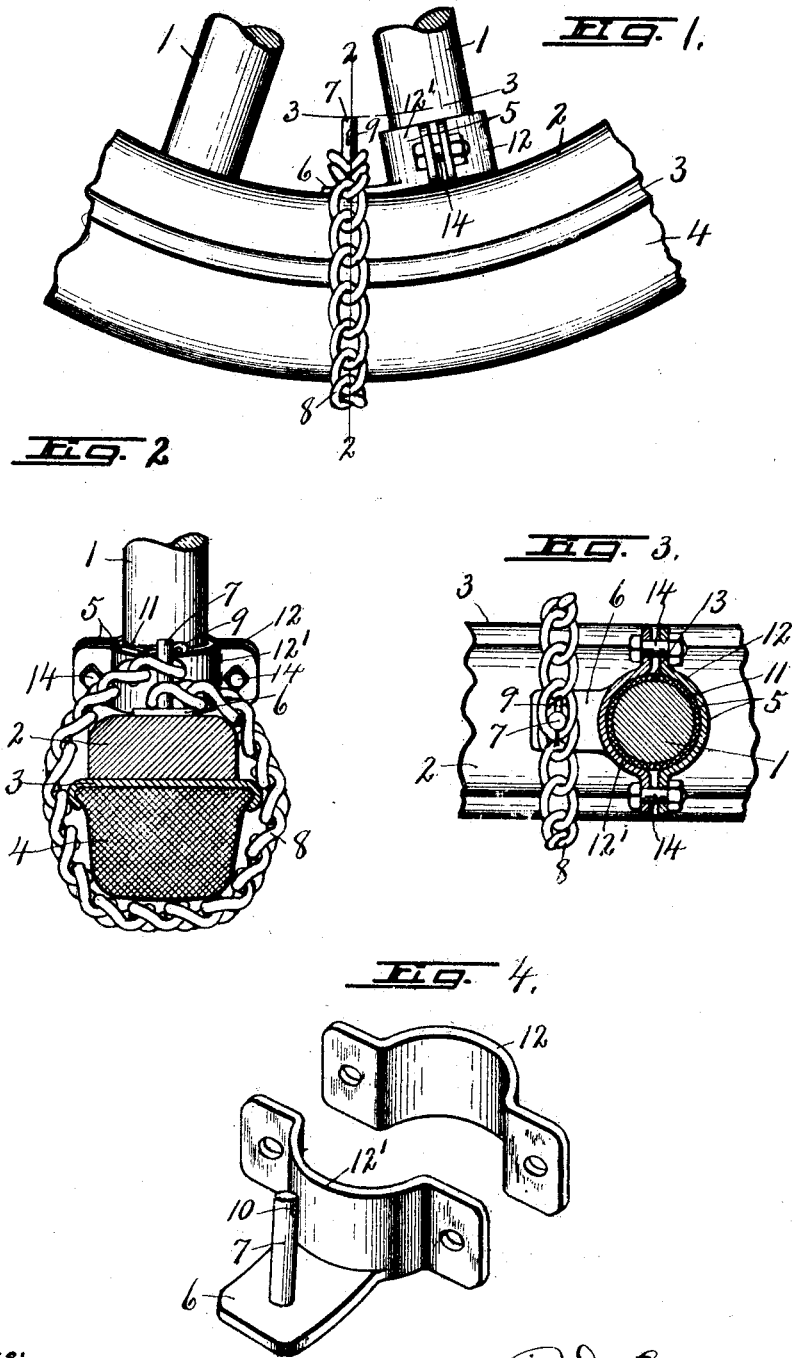

PATRICK DANIEL SKAHEN, OF SYRACUSE, NEW YORK, ASSIGNOR, BY MESNE ASSIGNMENTS, TO HENRY H. SIMPSON, OF BROOKLYN, NEW YORK.

ANTISKIDDING DEVICE FOR VEHICLES.

1,275,483.  Specification of Letters Patent.  Patented Aug. 13, 1918.

Application filed January 22, 1917. Serial No. 143,767.

*To all whom it may concern:*

Be it known that I, PATRICK D. SKAHEN, a citizen of the United States of America, and resident of Syracuse, in the county of Onondaga, in the State of New York, have invented new and useful Improvements in Antiskidding Devices for Vehicles, of which the following, taken in connection with the accompanying drawings, is a full, clear, and exact description.

This invention relates to certain improvements in anti-skidding devices for vehicle wheels, and more particularly for motor truck wheels having solid tires, and involves the use of one or more (preferably a plurality) of individual cross chains extending around the tread of the tire and across the inner face of the felly.

I am aware that various forms of devices have heretofore been proposed for this purpose, in which the ends of the cross chains have been attached to opposite sides of a clamping member on one or more of the spokes which produces more or less excessive strain and wear upon such spoke.

The main object of my invention is to transmit the strain directly to the felly rather than to the spoke by attaching both ends to a plate which rests upon the inner face of the felly and is suitably clamped to one of the spokes merely for the purpose of preventing undue displacement of the cross chains.

In other words, I have sought to concentrate the strains upon the cross chains at one and the same point upon the plate which rests upon the inner face of the felly so that the pull upon opposite sides of the chain will oppose each other at the same point of attachment and still leave the main body of the chain extended across the tread portion of the tire to change its position circumferentially of said tire within a limited range of movement to prevent excessive wear of the tire at any one point.

Other objects and uses relating to specific parts of the device will brought out in the following description.

In the drawings--

Figure 1 is a side elevation of a portion of a vehicle wheel showing my improved anti-skidding device attached thereto.

Fig. 2 is a transverse sectional view taken on line 2—2, Fig. 1.

Fig. 3 is a horizontal sectional view taken on line 3—3, Fig. 1.

Fig. 4 is a perspective view of the detached clamping members for attaching the device to one of the spokes, the clamping bolts and sleeve being omitted.

In order that my invention may be clearly understood, I have shown a portion of a wheel comprising spokes —1—, a felly —2— secured thereto, a rim —3— secured to the outer face of the felly, and a solid rubber tire —4— secured to the periphery of the rim, the securing means between the spokes, and felly and also between the spokes and rim and between the rim and tire being of any well-known construction now in common use.

The anti-skidding device forming the subject-matter of my invention comprises a clamp —5— adapted to be attached to one of the spokes near the felly —2— and provided with a circumferentially extending plate or ledge —6— which rests upon the inner face of the felly —2— between adjacent spokes and is provided with a radially projecting pin —7—.

A cross chain —8— is passed transversely around the tread of the tire and has both ends brought inwardly across the inner face of the plate or ledge —6—; one over the other and attached to the pin —7— by simply slipping the links at or near both ends of the cross chain in sequence over and upon the pin, after which they may be locked in this position by a removable member, such as a cotter key —9— passed through an opening —10— in the inner end of the pin —7—, as shown more clearly in Fig. 2.

The clamp —5— preferably comprises an inner sleeve —11—of felt, rubber or other flexible material and opposite concavo-convex clamping members —12— and —12'—.

The sleeve —11— is preferably split through one side at —13— to enable it to be placed around and upon the periphery of the spoke —1— at the point where the clamp —5— is to be attached, after which the clamping members —12— and —12'— are placed against opposite faces of the sleeve and secured in place by bolts —14—, as best shown in Fig. 3.

The clamp —5— is, therefore, divided through opposite sides, preferably in a plane parallel with the axis of the wheel so that the clamp as a whole may be readily removed by removing the bolts —14— or replaced by reverse operation.

The clamping members —12— and —12'— may be made of sheet metal, or comparatively light malleable castings, owing to the fact that the strains to which they are subjected are comparatively light by reason of the fact that the ends of the cross chains are attached to the inner face of the plate or ledge —6— at a point between the spokes, or some distance from the spoke to which the clamp is attached, so that the strains upon opposite sides of the cross chain under traction are transmitted directly to the plate and thence directly to the inner face of the felly radially to the wheel.

In other words, the strain upon opposite sides of the chain oppose each other and tend to draw the plate or ledge —6— firmly against the inner face of the felly, while the pin —7— holds the ends of the chain against separating.

It will be seen from the foregoing description taken in connection with the drawings that the cross chains may be readily detached from the plate —6— by simply removing the cotter key —9— and withdrawing the end links from the pin —7—, thus leaving the entire clamping device on the spoke ready for the reattachment of the cross chains when necessary.

The operation of attaching and removing the cross chains may, therefore, be accomplished without material loss of time or annoyance, all of which encourages the operator to save the needless wear of the chain when not actually needed for anti-skidding purposes.

What I claim is:

In an anti-skid device for vehicle wheels, the combination with the spokes, felly and tire, of a clamp attached to one of the spokes near the felly, one of the clamping members being provided with a circumferentially extending base plate adapted to rest upon the inner face of the felly, and a chain passed transversely around the tread of the tire and having its ends attached to said plate.

In witness whereof I have hereunto set my hand this 19th day of January, 1917.

PATRICK DANIEL SKAHEN.

Witnesses:
H. E. CHASE,
ALICE M. CANNON.